United States Patent
Mead

(10) Patent No.: US 8,016,250 B2
(45) Date of Patent: Sep. 13, 2011

(54) MULTIPURPOSE PORTABLE ERGONOMIC WORKSTATION

(76) Inventor: Daniel Wayne Mead, Eagan, MN (US)

( * ) Notice: Subject to any disclaimer, the term of this patent is extended or adjusted under 35 U.S.C. 154(b) by 292 days.

(21) Appl. No.: 12/381,177

(22) Filed: Mar. 9, 2009

(65) Prior Publication Data

US 2009/0230259 A1   Sep. 17, 2009

Related U.S. Application Data

(60) Provisional application No. 61/036,346, filed on Mar. 13, 2008.

(51) Int. Cl.
*B43L 15/00* (2006.01)
*B68G 5/00* (2006.01)

(52) U.S. Cl. .......... 248/118; 248/118.1; 248/118.5

(58) Field of Classification Search .......... 248/118.3, 248/118.1, 118.5, 118, 465.1
See application file for complete search history.

(56) References Cited

U.S. PATENT DOCUMENTS

| | | | | |
|---|---|---|---|---|
| 1,025,476 A | * | 5/1912 | Mellen | 248/118 |
| 5,915,661 A | * | 6/1999 | Silverman et al. | 248/465.1 |

* cited by examiner

*Primary Examiner* — Amy J Sterling

(57) ABSTRACT

A portable ergonomic workstation that is substantially a multiple purpose apparatus with applicable uses for small electronic repair, costume jewelry, factory assembly, hobbyists, craft workers, the physically challenged, etc. It includes a support frame that is attached to an arm rest base with an arm rest pad while accommodating multiple removable adjustable attachments that secure working materials. The apparatus allows optimal positioning of the upper body and the secured working materials. In one embodiment, the arm rest base attaches to incline extensions in an adjustable elevated pivotable position over the frame and attachments. This embodiment can also function as a standalone apparatus without attachments, in conjunction with existing non-ergonomic apparatuses or working materials. In another embodiment when a height adjustment is not desired or efficient the the support frame does not include the incline extensions.

14 Claims, 9 Drawing Sheets

MULTIPURPOSE PORTABLE ERGONOMIC WORKSTATION

RELATED APPLICATIONS

This application claims the benefit of PPA Ser. No. 61,036,346, filed Mar. 13, 2008 by the present inventor.

FEDERALLY SPONSORED RESEARCH

Not Applicable

SEQUENCE LISTING OR PROGRAM

Not Applicable

BACKGROUND OF THE INVENTION

Field of the Invention

This invention relates to portable workstations that provide upper body support, and more particularly an adjustable apparatus that while supporting the upper body of an individual, also allows for attachments that aid in securing small components that require assembly or repair, such as, but not limited to, costume jewelry, circuit boards, small electronics and craft items.

BACKGROUND OF THE INVENTION

Individuals who work with small components have always struggled with the task of securing small parts that are difficult to hold, needing additional hands to assemble or repair such items. Also, the upper body of an individual who performs such tasks endures a great deal of strain and stress, which can lead to many known ailments caused by repetitive motion, or static position and the strain it has upon soft muscle tissue.

The most relevant prior art found by the present applicant are U.S. Pat. No. 5,288,042 to Grimm, U.S. Pat. No. 5,108,057 to Dandy and Nespor, U.S. Pat. No. 5,692,712 to Weinschenk and Machael, U.S. Pat. No. 5,810,301 to McGrath, McGrath, and McGrath, U.S. Pat. No. 5,104,073 to VanBeek, U.S. Pat. No. 5,685,235 to Allan, U.S. Pat. No. 5,074,501 to Holtta, U.S. Pat. No. 5,984,160 to Santa Cruz and Long, U.S. Pat. No. 7,264,215 to Niehoff, Int. App. WO/2007/032739 to Smeds.

Ergonomics has been used in various applications. The prior art demonstrates apparatuses or devices designed to support the upper body when performing certain tasks or securing small components, the present applicant found no prior art designed that accomplishes both or achieves a wide range of functionality and use. In general, ergonomic support cited in the prior art is specifically used in applications that involve keystroke functions. The ergonomic support references cited in the prior art provide a purposeful function within its specific task, however, the use is limited to keyboard operations. Further prior art demonstrates apparatuses that perform functions of securing or supporting working materials, but they are confining in aspects of application, and do not provide the elements for ergonomic support.

Therefore, there is the need for a portable workstation that provides adjustment for individual comfort, that assists in physical relief, providing versatility of use when working with small components, or that physically benefits an individual with support to arms and wrists, whether sitting or standing to perform certain tasks.

The present invention improves upon prior art by providing a portable upper body support system, and along with attachments establishes an adjustable portable apparatus that allows optimal positioning of the upper body and the working materials being used. Furthermore, the functioning apparatus provides a benefit to the user that is not currently available.

BACKGROUND OF THE INVENTION

Objects and Advantages

It is an object of the present invention to provide a multipurpose portable workstation that assists, but is not limited to, the costume jewelry maker, the small electronic repair shop, the factory worker, the hobbyist, the craft worker, and the physically challenged.

It is a related object of this invention to alleviate muscle fatigue and strain for any individual who works with small components or would benefit from having upper body support while sitting or standing.

It is a further object of this invention to provide a workstation that is portable, that has ease of use and versatility, to provide ergonomic benefit to a wide range of individuals who do not presently have such an apparatus available to them.

It is another object of this invention to provide an arm rest that is supported by a support frame that also allows for multiple attachable accessories that provide a ergonomic benefit while assisting the user.

It is a related object of the present invention to provide a fully adjustable apparatus that provides optimal positioning of the upper body and working materials.

Yet another object of the present invention is to provide attachments that secure working materials to free the user's hands to use other tools, while providing upper body support.

Furthermore, it is another object of this invention to provide the option to use or not to use the attachable accessories. By providing an arm rest that is adjustable in height for an individual's comfort, opens the use of such an apparatus to a wide range of functions and tasks while providing an ergonomic benefit.

These and other objects and advantages of the present invention, along with the scope of applicability, will become more fully realized from the following description in conjunction with the accompanying drawings. However, it should be understood that while the detailed drawings and descriptions indicate the preferred embodiments of the invention, subsequent attachments and modifications within the spirit and scope of the invention may be apparent to those skilled in the art.

SUMMARY OF THE INVENTION

In accordance with the present invention, a multipurpose portable workstation comprised of a supporting frame, an adjustable arm rest, and an adjustable attachment or multiple thereof, providing upper body support while securing small components. The apparatus provides adjustment features that allow optimal positioning of the upper body and working materials.

DETAILED DESCRIPTION OF THE PREFERRED EMBODIMENTS

Figure 1:
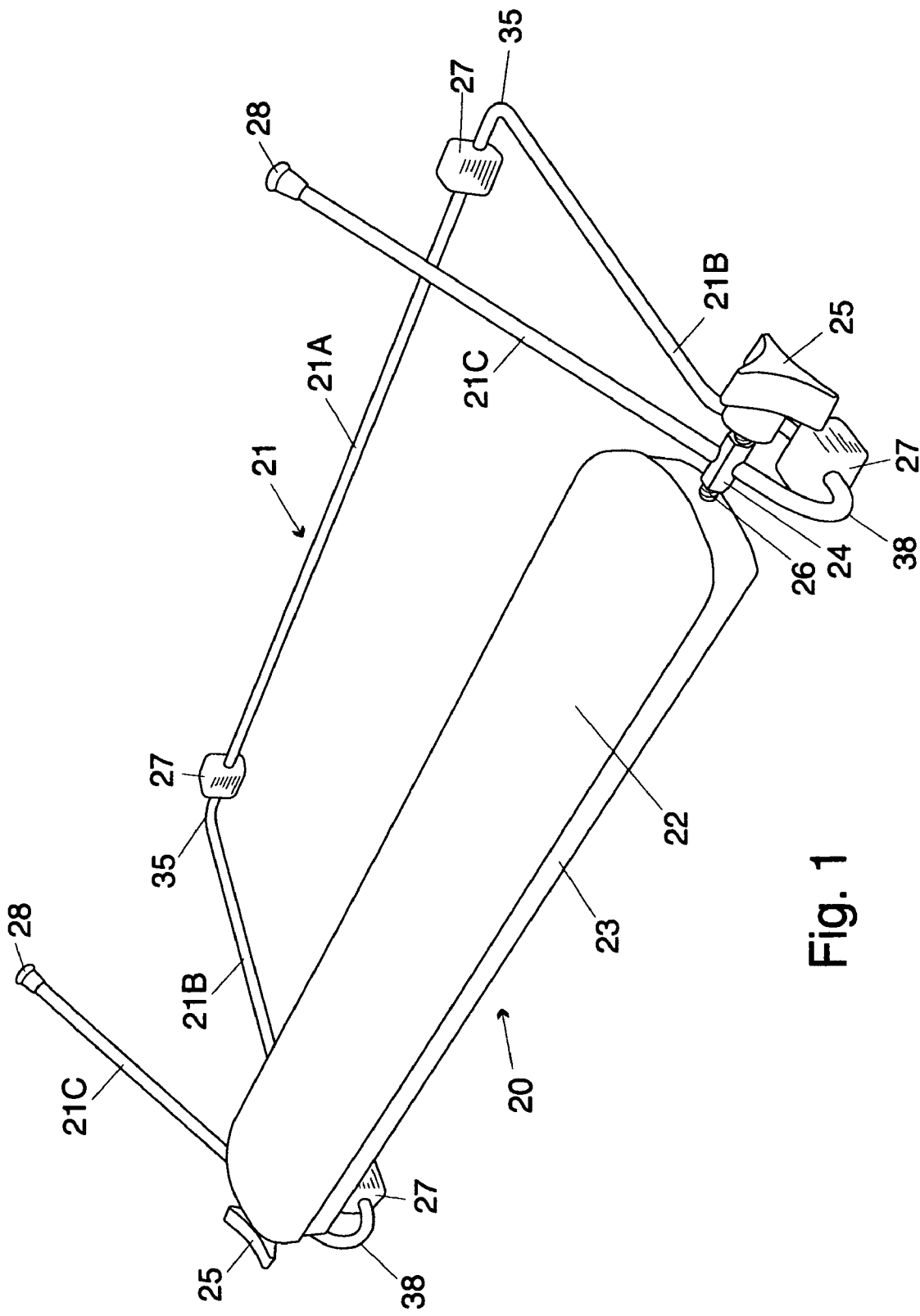
FIG. 1 is a perspective view of the present invention without attachments.

Referring now to the figures, like numerals refer to like elements throughout the various views. The following description refers to various illustrated embodiments of a multipurpose portable ergonomic workstation referred to here and throughout the various views as 20. It is to be noted that all elements of the preferred embodiments can be manufactured from substantially any suitable material that will support its use.

FIGS. 1-4 illustrate the ergonomic workstation 20 that includes a support frame indicated by arrow 21 throughout the various views. The support frame 21 made of at least one substantially elongated narrow span of equal thickness is formed from a substantially cross width span 21A with each end connecting to a sideways joint 35 with the opposing ends connecting to one end of each two substantially side spans 21B. The two extended lengths span a predetermined distance to a downward joint 36 (see FIG. 2) with each opposing end of the downward joint 36 connecting to a forward joint 37 with each opposing end of the forward joint 37 connecting to an incline joint 38 angling at a predetermined upward angle back toward said support frame 21. The downward joint 36 and forward joint 37 provide a downward jaunted protrusion that slopes the support frame 21 front to back when resting on a horizontal surface, shifting the inertia of weight of the user back into the support frame 21 for greater stability. The incline joints 38 are joined by a substantially incline extension 21C, that is directed back towards the structure adjacent to each other at a relatively ninety degree angle from the cross width span 21A. The joints as illustrated are made of several bends in one substantially elongated narrow span, but the joints can be any of various devices for fastening multiple spans. The two adjacent incline extensions 21C are the support structure for an arm rest base 23 accompanied by an arm rest pad 22 with a flat underside adhered to the upper surface of the arm rest base 23. The arm rest base 23 and arm rest pad 22 are of predetermined elongated shape and are of a length to span the distance between the two incline extensions 21C.

The arm rest base 23 and each incline extension 21C is interconnected by a substantially threaded cylinder 26 and a joint coupler 24 movably attached to each extension. The joint coupler 24, which is of substantially elongated shape, has a female threaded bore 24B throughout the length (see FIG. 3 and FIG. 4), with an intersecting smooth bore hole 24A through the center width the same thickness as the incline extensions 21C. The threaded cylinders 26 are bored centrally into each end of the arm rest base 23. One end of each joint coupler 24 is threadedly mated onto each threaded cylinder 26 and the inclined extensions 21C are slid through the smooth bore hole 24A. The arm support structure is locked into position using a tension knob 25, which includes an attached protruding secondary threaded cylinder 26A. The secondary threaded cylinder 26A attached to the tension knob 25 is threadedly mated to the female threaded bore 24B of each respective end of the two joint couplers 24. When each tension knob 25 is tightened, the two incline extensions 21C extending through the smooth bore hole 24A in each joint coupler 24 are sandwiched between the threaded cylinder 26 and secondary threaded cylinder 26A on each end of the arm rest base 23 temporarily securing at a desired height.

Figure 2:
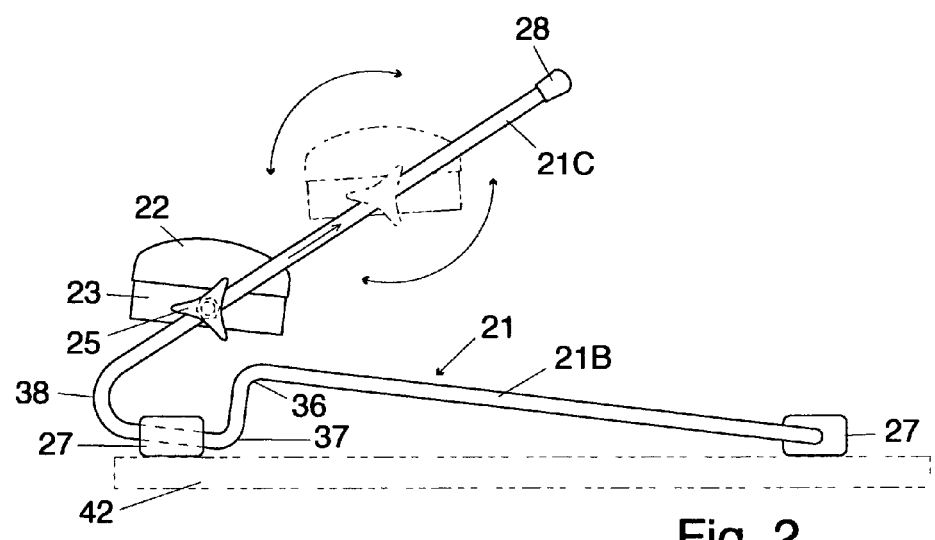
FIG. 2 is a side view of the present invention without attachments.

The support frame 21 is stabilized on any resting surface 42 (see FIG. 2). Stabilization is established by a rubber stop 27 positioned between the incline joint 38 and the forward joint 37, and rubber stops 27 are also positioned onto the two adjacent ends of the widthwise length of the support frame 21 (see FIG. 3). The rubber stops 27 are of predetermined size and shape that complete the objective and are attached to the support frame 21. Each end of the two incline extensions 21C can be capped with a tip cover 28 for added safety from scratching and aesthetic appeal.

Additional Embodiments

Referring now to additional embodiments, this description details individual attachments, each providing a similar function, but depending on the task at hand and materials used, each would provide a diversity of approaches and expansion of use.

It is also to be noted, each attachment provides the user with an apparatus that assists them in securing small components while the user's hands are free to perform desired tasks. And while these attachments provide a possibly desired function and usefulness, the ergonomic workstation 20 also functions as a freestanding apparatus, to be set alongside other apparatuses or materials to assist the user in performing tasks while benefiting from upper body support.

However, it should be understood that the drawings and brief descriptions are indicating additional embodiments of the invention, and subsequent attachments and modifications within the spirit and scope of the invention may be apparent to those skilled in the art.

Figure 5:
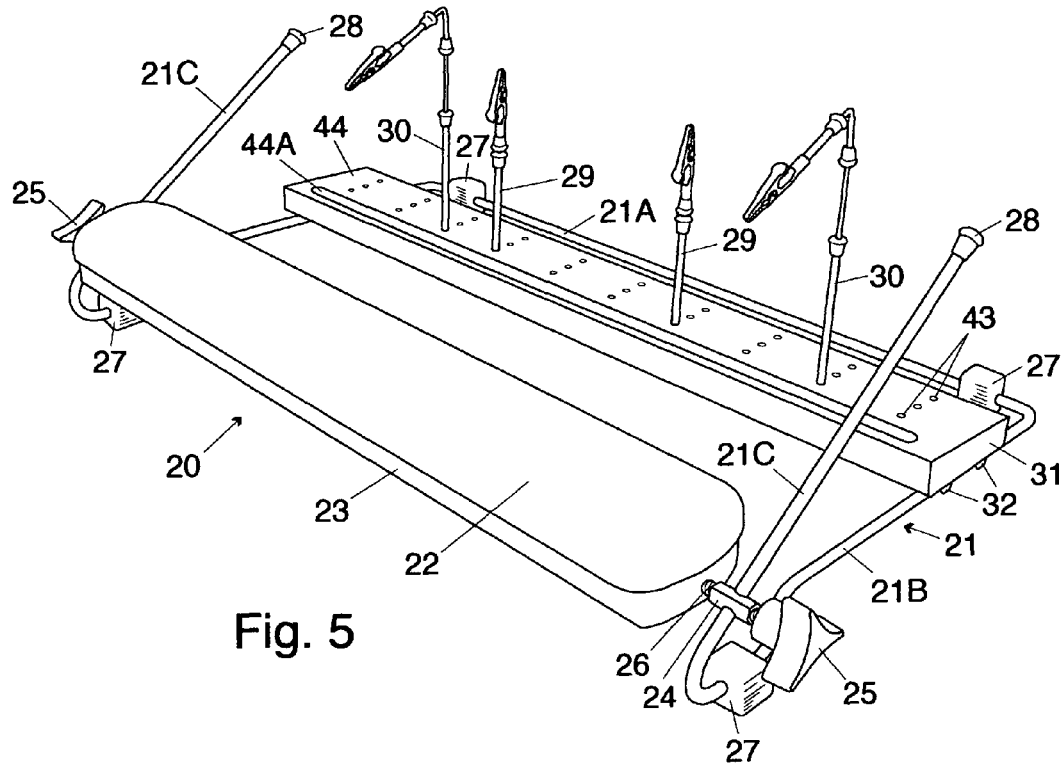
FIG. 5 is a perspective view of the present invention with linear attachment and post clamps.
Figure 6:
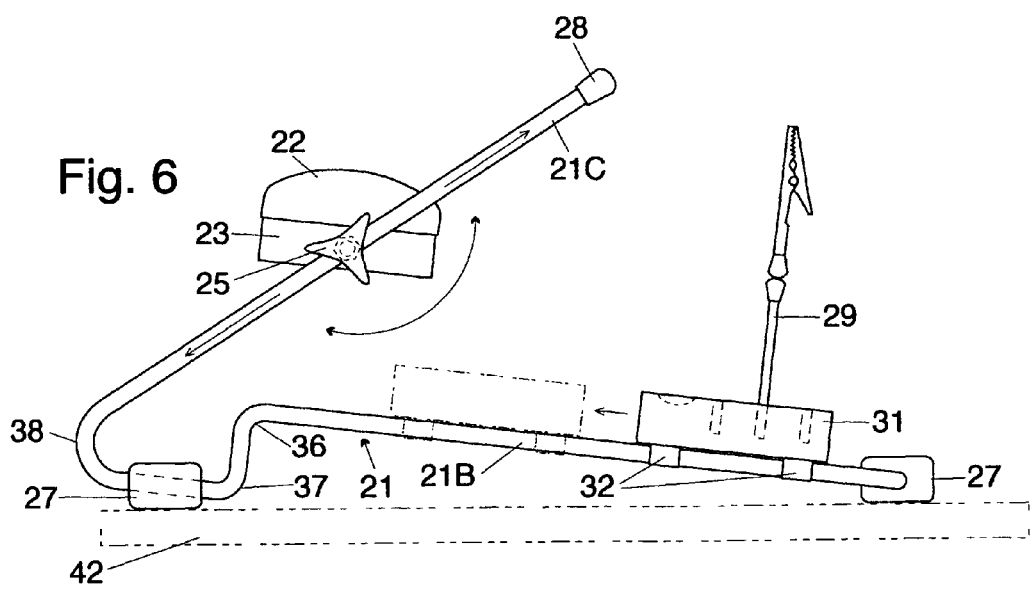
FIG. 6 is a side view of present invention with linear attachment and post clamps.

FIGS. 5 and 6 illustrate a linear attachment 31 mounted onto the ergonomic workstation 20. The linear attachment 31 is a predetermined elongated shape at a width and depth that provides a work surface 44 running linear across the ergonomic workstation 20 and mounts to each side span 21B. Mounting is established by an attachment clip 32 fastened to each of the four adjacent corners of the bottom portion of the linear attachment 31. It should be noted that the attachment clips 32, are of a type that will allow the support frame 21 to adjustably slide into and be removably mounted into desired position.

Figure 15:
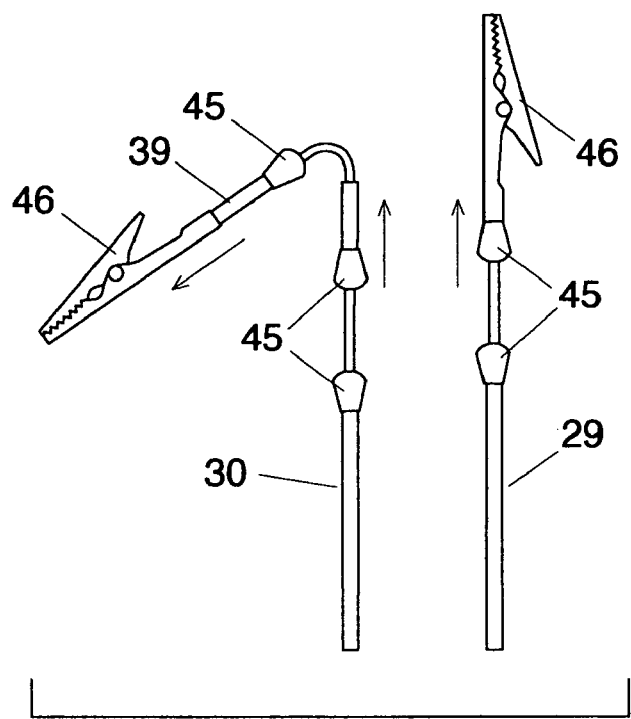
FIG. 15 is a side view of telescopic post clamp accessories.

The work surface 44 has a plurality of post holes 43 drilled into the linear attachment 31 in a random or set pattern of rows. A straight post 29 and an angled post 30 are inserted into the post holes 43 and positioned optimally by the user for each individual task. The straight posts 29 and angled posts 30 are telescopic in nature for height adjustment and have a spring clamp 46 attached to the projected end of each (see FIG. 15). The straight posts 29 and angled posts 30 may also have a friction cap 45 positioned at determined locations to provide increased resistance when using the telescopic feature of the posts. The angled posts 30 would also have the added advantage of the telescopic feature at the angled extension 39 of the post, for ease of adjustment to optimal position.

In addition, the linear attachment 31 can also have multiple or a single router groove 44A that relatively spans the length of the work surface 44, providing a location for small working materials or tools.

Figure 7:
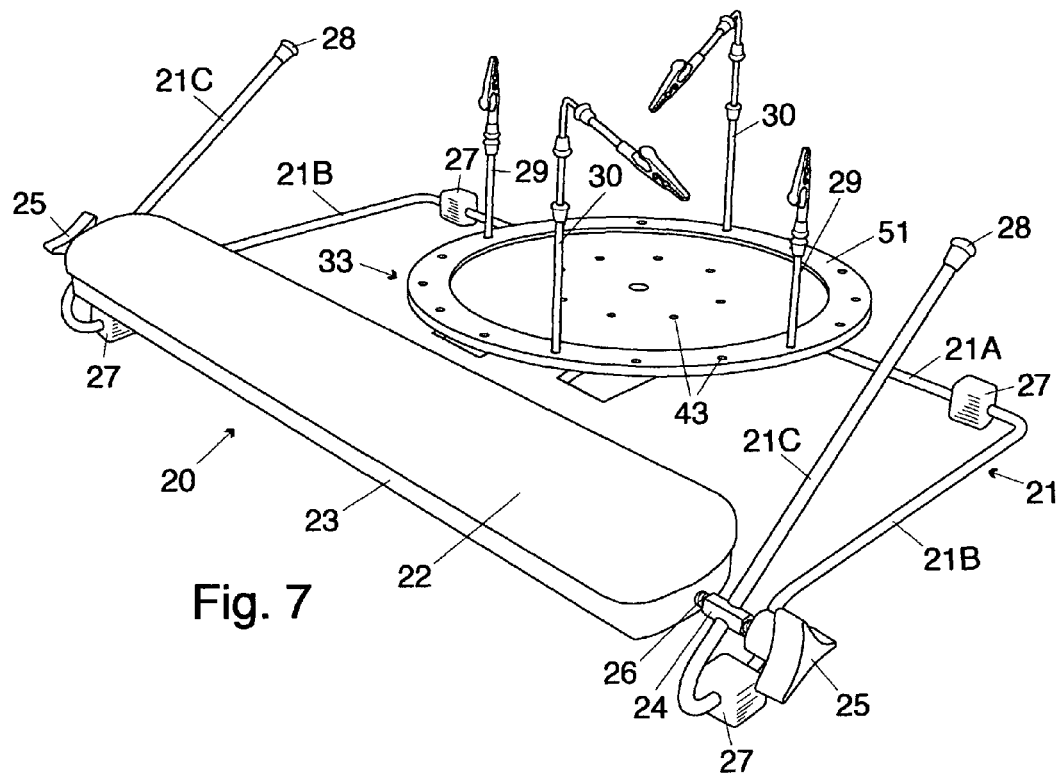
FIG. 7 is a perspective view of the present invention with circular attachment and post clamps.
Figure 8:
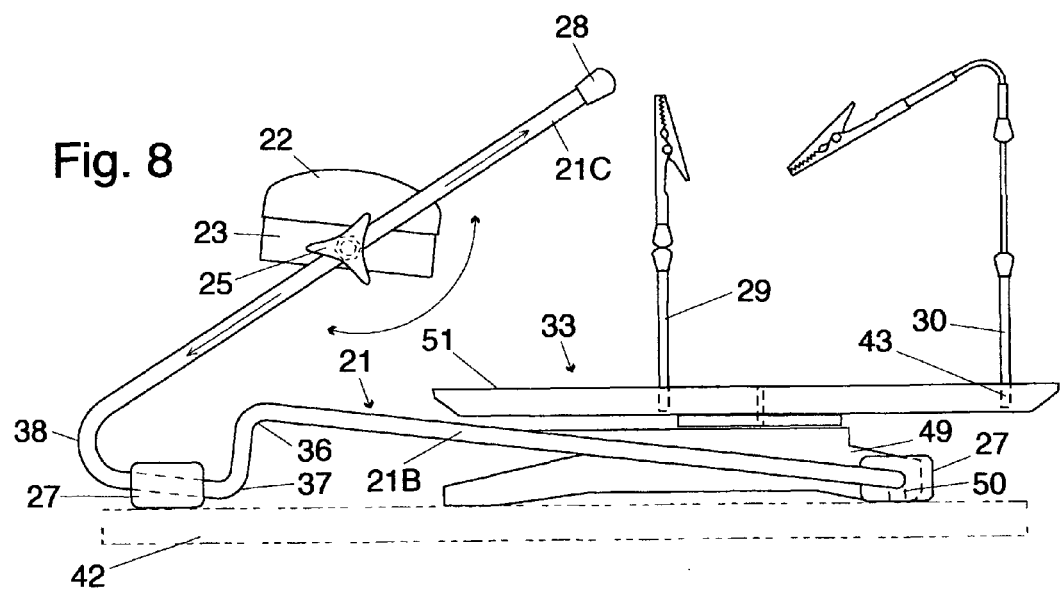
FIG. 8 is a side view of present invention with circular attachment and post clamps.

FIGS. 7 and 8 illustrate a circular attachment 33 that has an attachment base 49 that removably mounts onto the support frame 21 by a vertical notch 50 routed into the rear bottom of the attachment base 49. The circular attachment 33 is of a predetermined size and scope of functionality, with basic features as noted: a circular surface 51 with adjustable rotation, a plurality of post holes 43 drilled into the surface of the circular surface 51 in a substantially circular or random pattern, and an adjustable feature that allows the circular surface 51 to slide towards or away from the user.

The circular attachment 33 would also use the telescopic straight posts 29 and angled posts 30 along with the attached clamps 46 (see FIG. 15) that are described previously.

Figure 9:
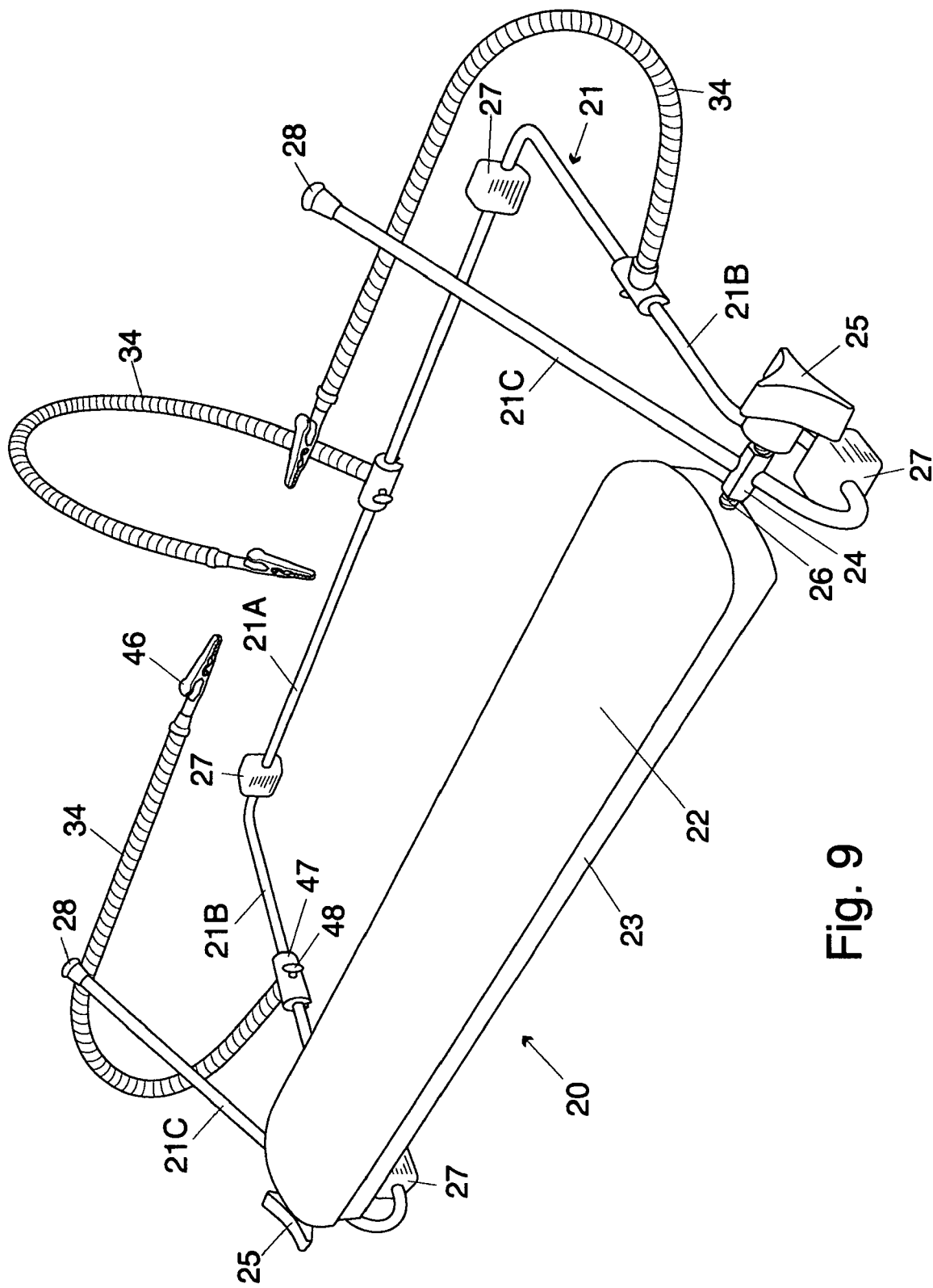
FIG. 9 is a perspective view of the present invention with flexible arm attachments.

FIG. 9 illustrates a flexible arm attachment 34 of a substantially tactical strength and length that mounts onto the support frame 21 by a C-shaped bracket 47 and is removably mounted by a thumb screw 48 of cylindrical shape with male threads. Flexible arms 34 are commonly manufactured with an articulated invertebrate characteristic and have a variant degree of strength, depending on a number of factors. The tactical strength of the flexible arm attachment 34 would be determined based on intended use. Multiple flexible arm attachments 34 can be attached (see FIG. 9) and used for a diversity of purposes. The C-shaped bracket 47 (see FIG. 16) is of a substantially cylindrical nature that has a separation running through the length allowing the user to fasten the C-shaped bracket 47 onto the support frame 21. The thumb screw 48 is tightened to removably mount the arm attachment 34 into position. One of the spring clamps 46 is also fastened to each projected end of the flexible arm attachment 34 for securing working materials when working. The ergonomic workstation 20 would provide adjustable upper body support while providing the structure to support the flexible arm attachments 34.

Operation

FIGS. 1 and 2 illustrate the multipurpose portable ergonomic workstation as a standalone apparatus. The manner in which this apparatus would function and what allows it to function will be covered here. First, the support frame 21 is what gives the apparatus the structure that is required to allow the ergonomic workstation 20 to function. The arm rest pad 22 supported by the arm rest base 23, which interconnects with the incline extensions 21C, is adjusted for height by rotating and loosening the tension knobs 25 from the female threaded bore 24B bored through the joint coupler 24 that is mounted on each end of the apparatus. While the tension knobs 25 are loosened, the smooth bore hole 24A (see FIGS. 3 and 4) bored through the width of each joint coupler 24 allows the user to slide the joint coupler 24 mounted on each end, up or down the incline extensions 21C to adjust for individual comfort. Once the arm rest pad 22 is adjusted for comfort and effectiveness the tension knobs 25 that include the secondary threaded cylinder 26A, are retightened firmly against the incline extension 21C. The centrally located substantially threaded cylinder 26 bore into each end of the arm rest base 23 and threaded into each joint coupler 24 permits the arm rest pad 22 to rotate to and fro centrally along axis as the user maneuvers and supports their arms (see FIG. 2).

For stability, the inertia of weight from the user when supporting the arms and upper body, is shifted into the support frame 21 by providing a slope to the support frame 21, forward to back. This is accomplished by the downward joint 36 and the forward joint 37, in the side spans 21B just before the incline joint 38, which continues up into the incline extensions 21C (see FIG. 2). Because the incline extensions 21C project the arm rest base 23 over the support frame 21, the weight is also distributed into the support frame 21. For added stabilization for the ergonomic workstation 20 not to slide on the resting surface 42, the rubber stops 27 are mounted onto the support frame 21, between the forward joint 37 and the incline joint 38. The rubber stops 27 are also mounted to the cross width span 21A between the two sideways joints 35 (see FIGS. 1 and 3), which gives the back portion of the apparatus stability on the resting surface 42.

Although the ergonomic workstation 20 is designed to be used in conjunction with the described attachments, it can also be used as a standalone apparatus for numerous applications.

One example is the factory worker who has an existing non-ergonomic apparatus for securing small materials that they work with (not shown), who would benefit from arm and upper body support. Another example: the fly fisherman who enjoys tying his or her own flies (not shown). A number of serious fly fisherman who tie their own flies, generally use a freestanding vise. After the apparatus is positioned on a surface, the freestanding vise (not shown) would be positioned within the two side spans 21B. The user would loosen the tension knobs 25 on each end of the apparatus and adjust the arm rest pad 22 up or down the incline extensions 21C accordingly, for individual comfort and effectiveness. The user would preferably adjust the height of his or her chair to accommodate for individual comfort, or the user could prefer to stand if the workbench is of appropriate height (not shown). The arm support provided, along with the feature of height adjustment, would give the user an added advantage to reduce strain and stress to the upper body.

FIGS. 5 and 6 illustrate the ergonomic workstation 20 with the linear attachment 31 applied. There would be a number of uses for this attachment. One example is for someone who makes costume jewelry. It should be noted the following example is just one of many, of how a costume jewelry maker would use the present invention with this linear attachment 31.

Once the user positions the ergonomic workstation 20 onto a workbench or table, the attachment clips 32 fastened to the bottom of the linear attachment 31 would be used to removably mount the attachment to each side span 21B. The user would adjust the height of their chair and the arm rest pad 22 for individual comfort and effectiveness or the user may choose to stand, and would adjust the arm rest pad 22 accordingly. The linear attachment 31 would also be adjusted for individual comfort by sliding the attachment forward or backward along the side spans 21B (see FIG. 6).

The straight posts 29 and angled posts 30 would be inserted into any of the plurality of post holes 43 that are drilled into the work surface 44 of the linear attachment 31. The straight posts 29 would be positioned into the work surface 44 at the optimal location for the specific task at hand. For example, when the user is working on a chain necklace (not shown), the straight posts 29 would be positioned adjacent from each other along the linear length of the attachment at a distance that would provide optimal advantage. The user would secure each end of the chain to the straight posts 29 by utilizing the clamps 46 attached to the straight posts 29 (see FIG. 15). The user would have the option of adjusting the height of the secured chain, by using the telescopic feature of each straight post 29. The friction cap 45 would provide additional resistance in holding the chain at the desired height (also see FIG. 15). The user would rest their arms on the arm rest pad 22, and using tools (not shown) specifically designed for such work and their hands, would attach clasps, jump rings, head pins, beads, gemstones, etc. (not shown) to the chain. The plurality of post holes 43 (see FIG. 5) also provides the option of a plurality of the straight posts 29 to be mounted onto the work surface 44, allowing multiple strands of chain or other material lengths to be assembled at the same time.

The user also would have the option of using the angled posts 30 for the assembly of earrings, bracelets, etc. (not shown). The angled posts 30 would also be positioned at a optimal location within the work surface 44. The user would attach a wire ring, chain or other materials (not shown) to make the earrings to the clamp 46 attached to the end of the angled posts 30. Once again, the user would rest their arms on the arm rest pad 22, and using the required tools, would attach clasps, jump rings, head pins, beads, gemstones, etc. to the desired earring material. The user would again have the option of adjusting the height of the secured material, by using the telescopic feature of each angled post 30. The angled posts 30 would also have the added advantage of the telescopic feature at the angled extension 39 of the post, for extending the working materials into optimal position (see FIG. 15). The router groove 44A within the length of the linear attachment 31 would provide a location for small working materials or tools that the user may need.

It is to be noted that in this example, the user benefits from the ergonomic support provided by the adjustable arm rest pad 22, while certain materials are allowed to be secured by the adjustable linear attachment 31 and accessories, which also provides strain and stress relief (see FIG. 5). So, by working together, the adjustable ergonomic workstation 20 and attachment provide ergonomic benefits while assisting the user.

FIGS. 7 and 8 illustrate the ergonomic workstation 20 with the circular attachment 33 applied. There would also be a number of uses for the circular attachment 33. One example would be for small electronic repair. It should be noted that the following example is just one of many, of how the present invention with the circular attachment 33 would be utilized for small electronic repair.

The circular attachment 33 would mount onto the support frame 21 along the cross width span 21A between the back rubber stops 27 using the vertical notch 50 routed into the rear bottom of the attachment base 49. The user would adjust the height of their chair and the arm rest pad 22 for individual comfort and effectiveness or the user may choose to stand, and would adjust the arm rest pad 22 accordingly.

The straight posts 29 and angled posts 30 would be inserted into any of the plurality of post holes 43 that are drilled into the circular surface 51 of the circular attachment 33. The posts would be positioned into the circular surface 51 at the optimal location for the specific task at hand. For example, if the user was repairing a circuit board (not shown), the angled posts 30 along with the clamps 46 attached, could be used to temporarily secure and position the circuit board at the optimal height and angle. The straight posts 29 could be used to secure and position working materials, like wires, electrodes, diodes, etc., while the user's hands are free to solder or perform other tasks.

FIG. 9 illustrates the ergonomic workstation 20 with the flexible arm attachment 34 applied. Flexible arms attachment 34 are commonly manufactured with an articulated invertebrate characteristic and have a variant degree of strength, depending on a number of factors. The tactical strength of the flexible arm attachment 34 would be determined based on intended use. There would be multiple uses for the flexible arm attachment 34. One example would be for the hobbyist who builds model planes (not shown). The flexible arms 34 would be mounted onto the support frame 21 using the C-shaped bracket 47 attached to each arm, and removably mounts into place with the thumb screw 48 tightened against the support frame 21. Multiple flexible arm attachments 34 could be mounted to the support frame 21 anywhere along the side spans 21B or the back cross width span 21A.

With most model building there is a great deal of gluing to attach components together, and holding those components together for a certain period of time is usually necessary. The flexible arm attachment 34 would give the model builder a wide flexible range of use, where various size components could be secured with the clamps 46 (see FIG. 16) that are attached at the end of each flexible arm attachment 34.

The flexible arms attachment 34 with the clamps 46 could also be used for painting the model planes, where many model builders use an airbrush (not shown) powered by an air compressor to spray the paint onto the model. The flexible arm attachments 34 would allow for the adjustment of the models position while in the process of painting. The flexible arm attachments 34 could also be beneficial in assisting the user in securing wires and other small components when motorization models are being built. The ergonomic workstation 20 would provide adjustable upper body support while providing the structure to support the flexible arm attachments 34.

Alternative Embodiments

It is to be noted subsequent attachments and modifications within the spirit and scope of the alternative embodiments may be apparent to those skilled in the art.

Figure 10:
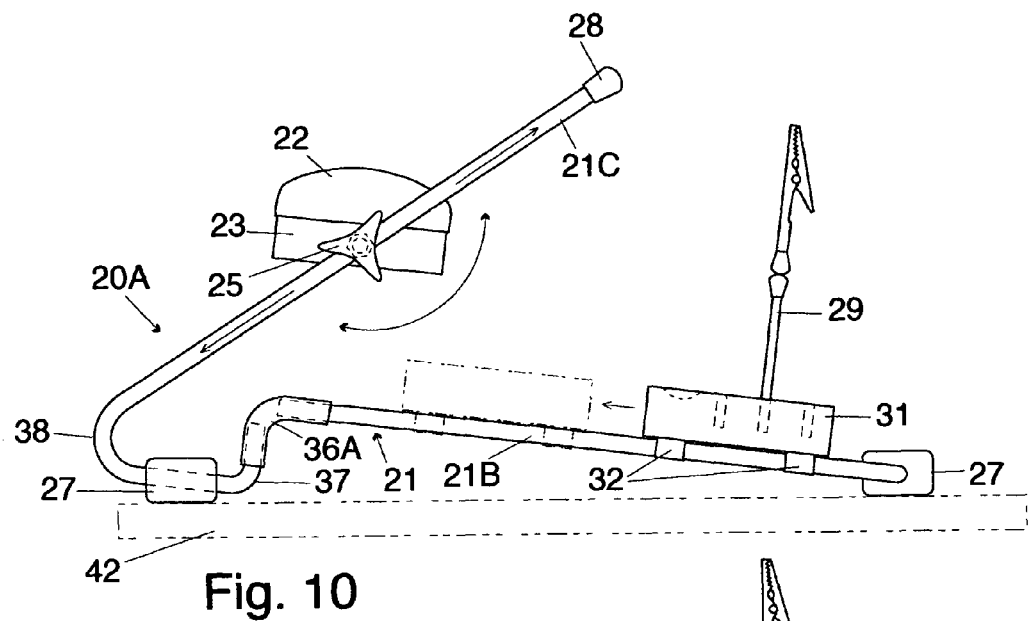
FIG. 10 is a side view of a second embodiment of the present invention with a supplemental removable downward extension joint applied.
Figure 11:
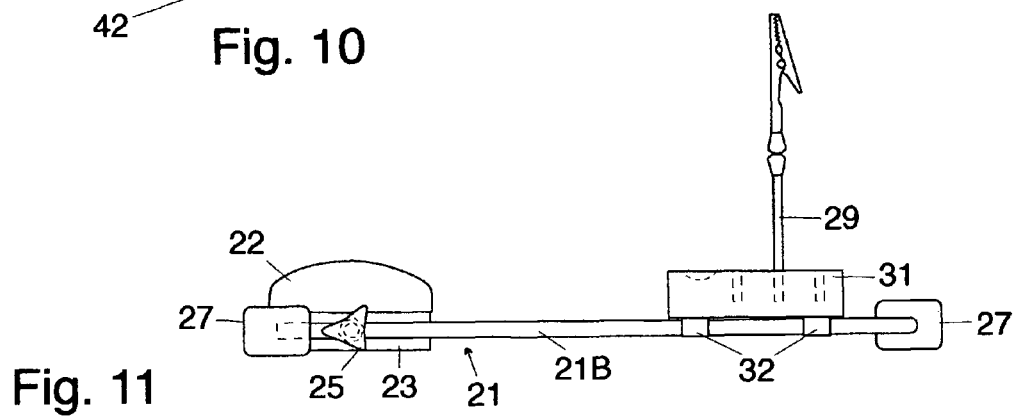
FIG. 11 is a side view of the second and third embodiment with the supplemental removable extension joint removed and the present invention modified.

FIG. 10 illustrates a second embodiment of an ergonomic workstation 20A in most ways similar to the ergonomic workstation 20 shown in FIGS. 5 and 6. In this alternative a supplemental removable downward extension joint 36A is joined to the extended end of each side span 21B as a means to temporarily connect the arm rest base 23 to the support frame 21 in a height adjustable position. The downward extension joint 36A is also joined to the forward joints 37 and incline joints 38 that connect to the incline extensions 21C. The arm rest base 23 is then adjustably connected to the incline extensions 21C as described in the preferred embodiment. The supplemental element provides the user with an apparatus that optionally functions with an elevated height adjustable arm rest pad or when a height adjustment for upper body support is not desired or efficient, the downward extension joint 36A is removed. In that usage, the arm rest base 23 is attached directly to the side spans 21B with the two joint couplers 24 and threaded cylinders 26 as described in the preferred embodiment, in a flat horizontal position as shown in FIG. 11.

Figure 12:
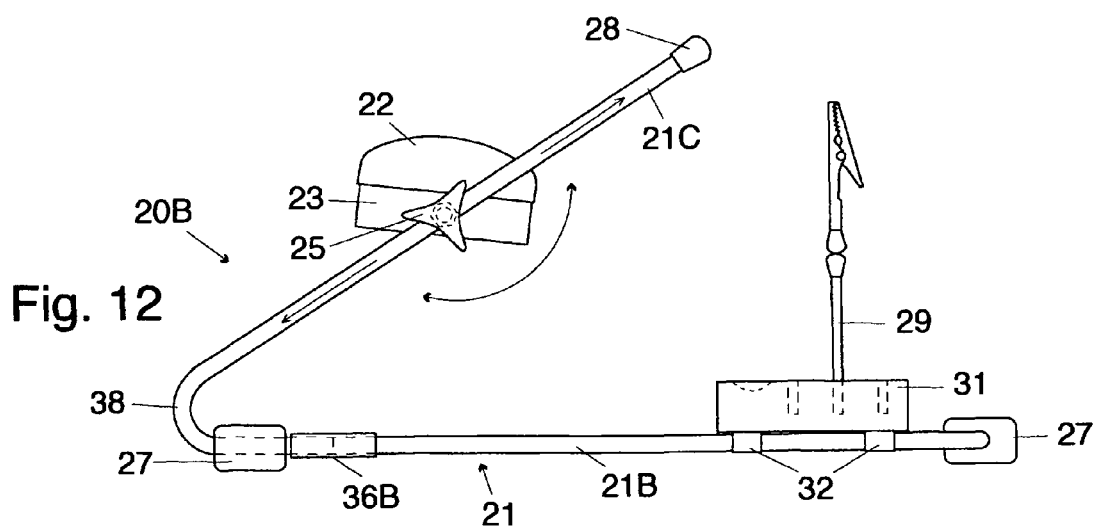
FIG. 12 is a side view of a third embodiment of the present invention with a supplemental forward extension joint applied.

FIG. 12 illustrates a third embodiment of an ergonomic workstation 20B where a supplemental removable forward extension joint 36B is used as an alternative to the downward extension joint 36A, and the forward joints 37 shown in FIG.

10. The forward extension joint 36B is joined to the two side spans 21B as a means to temporarily connect the arm rest base 23 to the support frame 21 in a height adjustable position without the downwardly jaunted protrusion as described in the preferred embodiments. The forward extension joint 36B is connected to the incline joints 38 that connect to the incline extensions 21C that angle back toward the support frame 21. The arm rest base 23 is then adjustably connected to the incline extensions 21C as described in the preferred embodiment. The supplemental element provides the user with an apparatus that functions with an elevated height adjustable arm rest pad or when a height adjustment for upper body support is not desired or efficient, the forward extension joint 36B is removed. In that usage, the arm rest base 23 is attached directly to the side spans 21B with the two joint couplers 24 and threaded cylinders 26 as described in the preferred embodiment, in a flat horizontal position as shown in FIG. 11.

Figure 13:
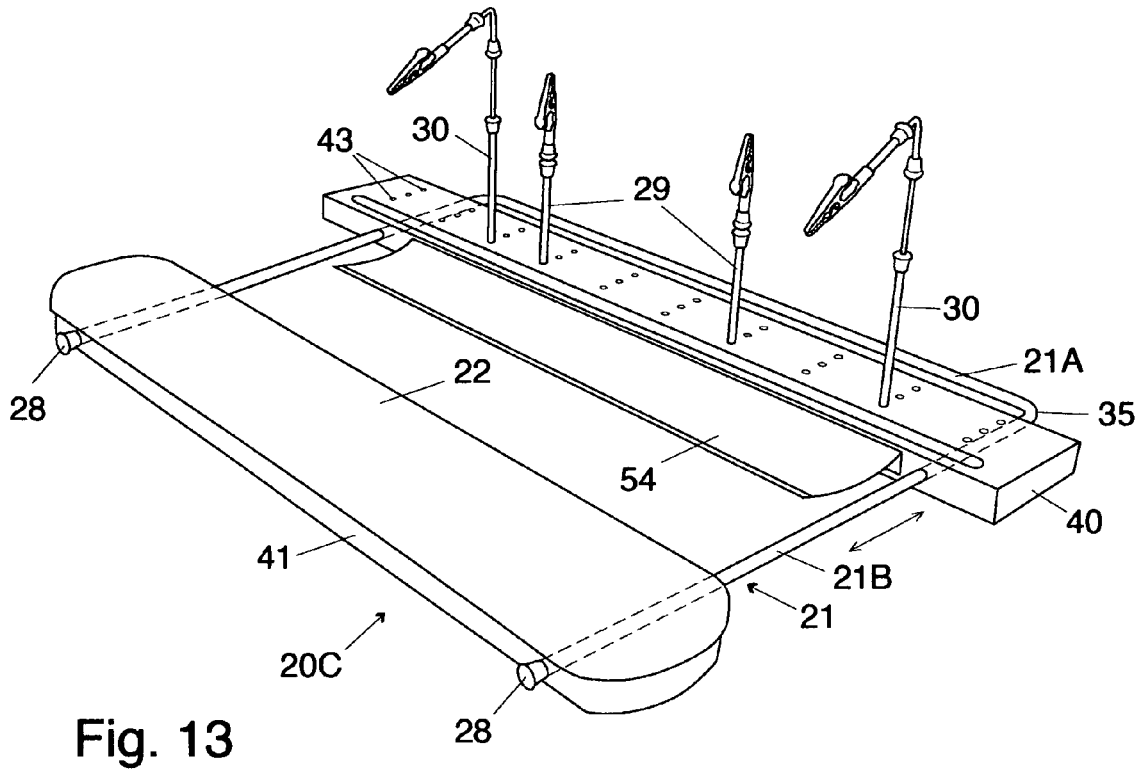
FIG. 13 is a perspective view of a fourth embodiment of the present invention.
Figure 14:
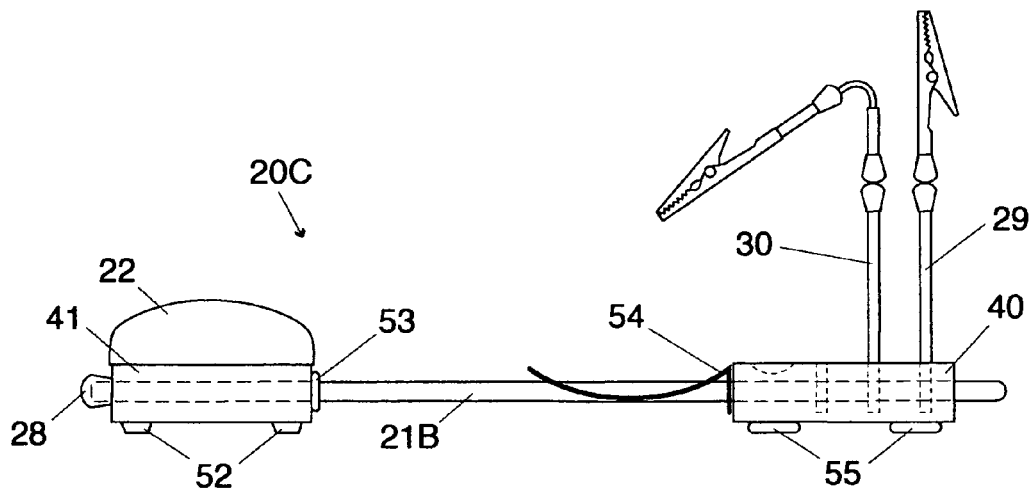
FIG. 14 is a side view of the fourth embodiment of the present invention.

FIGS. 13 and 14 illustrate a fourth embodiment of a ergonomic workstation, which is referred to here as 20C, in many ways similar to the ergonomic workstation 20 shown in FIGS. 5 and 6, but with a few variances that will be covered here. The main variance from the preferred embodiment is the support frame 21 not connected to additional joints and extensions that elevate the said arm rest base 23, which may be implemented when a height adjustment for upper body support is not desired or efficient.

The support frame 21 is formed from a substantially cross width span 21A joined by two sideways joints 35 as described in the preferred embodiment, to one end of each of two substantially side spans 21B.

Figure 3:
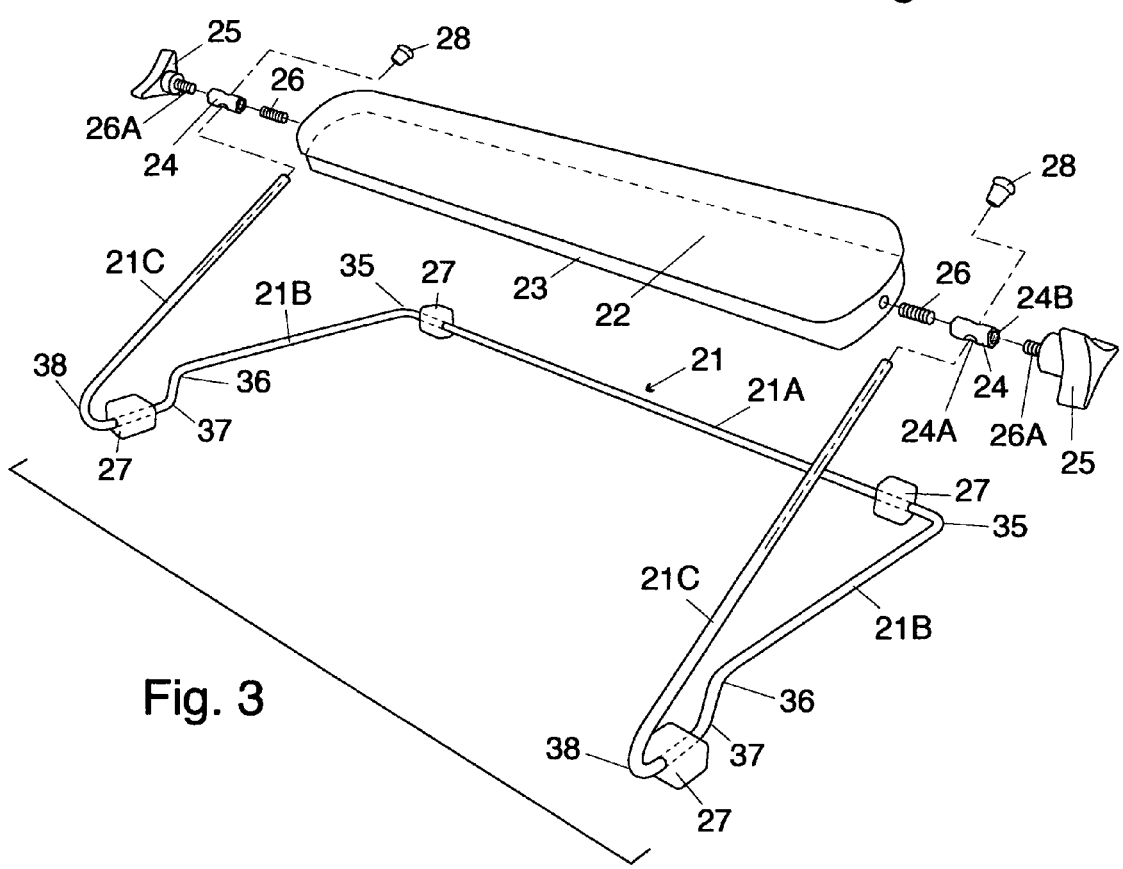
FIG. 3 is an exploded view of the present invention without attachments.
Figure 4:
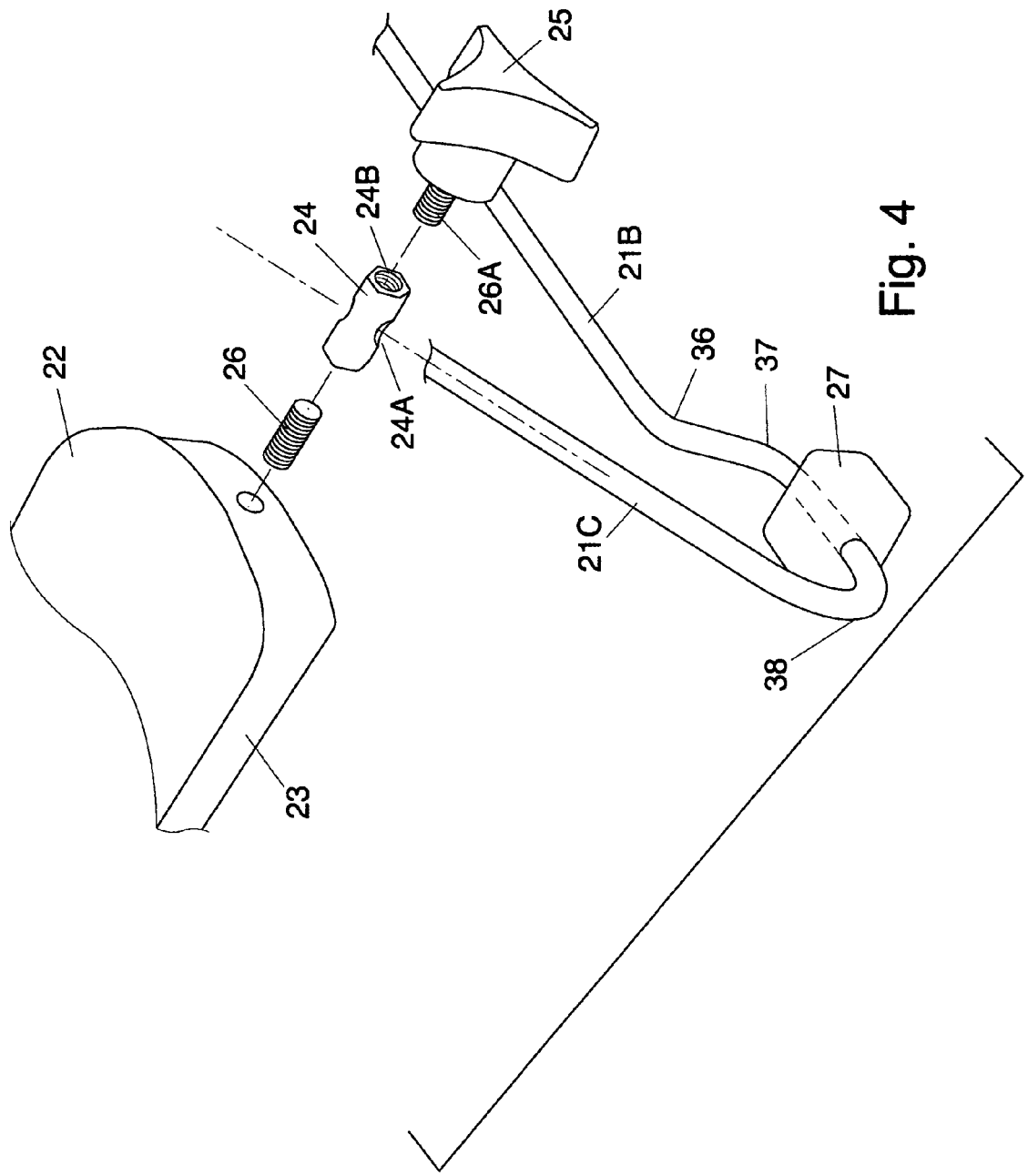
FIG. 4 is a partial exploded view of arm rest assembly.

An alternative arm rest base 41 with the arm rest pad 22 described in the preferred embodiments and shown in FIGS. 1-3 adhered to the upper surface of the alternative arm rest base 41. Two holes are bored through the width of the alternative arm rest base 41 vertically centered within the depth, the same thickness as the support frame 21. A linear table 40 is applied in this alternative view and also has two holes bored through the width, vertically centered within the depth. The alternative arm rest base 41 and linear table 40 are of a predetermined elongated shape and of equal depth and the holes bored through their width are of equal distance apart, equaling the distance between the two side spans 21B on the support frame 21.

The apparatus is assembled by inserting the two side spans 21B through the corresponding bore holes on the linear table 40 first and through the alternative arm rest base 41 second. Before the alternative arm rest base 41 is applied to the support frame 21 an O-ring stop 53 of sufficient size is slid onto each side span 21B and then the alternative arm rest base 41 is applied to the support frame 21. The O-ring stops 53 are effective in holding the alternative arm rest base 41 in a stationary position, along with the two ends of the side spans 21B being capped with tip covers 28, as described in the preferred embodiments. The position of the linear table 40 is adjustable in distance from the upper body support along the track of the two side spans 21B for individual comfort and effectiveness.

The linear table 40 also has the plurality of post holes 43 as described in the additional embodiments and shown in FIG. 5. And again the telescopic straight posts 29 and angled posts 30 are inserted into the post holes 43 and have the spring clamp 46 attached to the projected end of each (see FIG. 15) and positioned optimally by the user for each individual task.

The bottom of the alternative arm rest base 41 would have a rubber foot 52 adhered to each of the four adjacent corners. This provides a non-slip characteristic to the alternative arm rest base 41 when weight is applied by the user. Furthermore, the bottom of the linear table 40 would have a soft pad 55 adhered to each of the four adjacent corners, allowing the linear table 40 to slide in a smooth and unobstructed manner when adjusted by the individual user.

A drop tray 54 may be attached to the linear table 40 between the alternative arm rest base 41 and the linear table 40. The drop tray 54 could be used for holding small working materials or possibly tools when the apparatus is in use.

Figure 16:
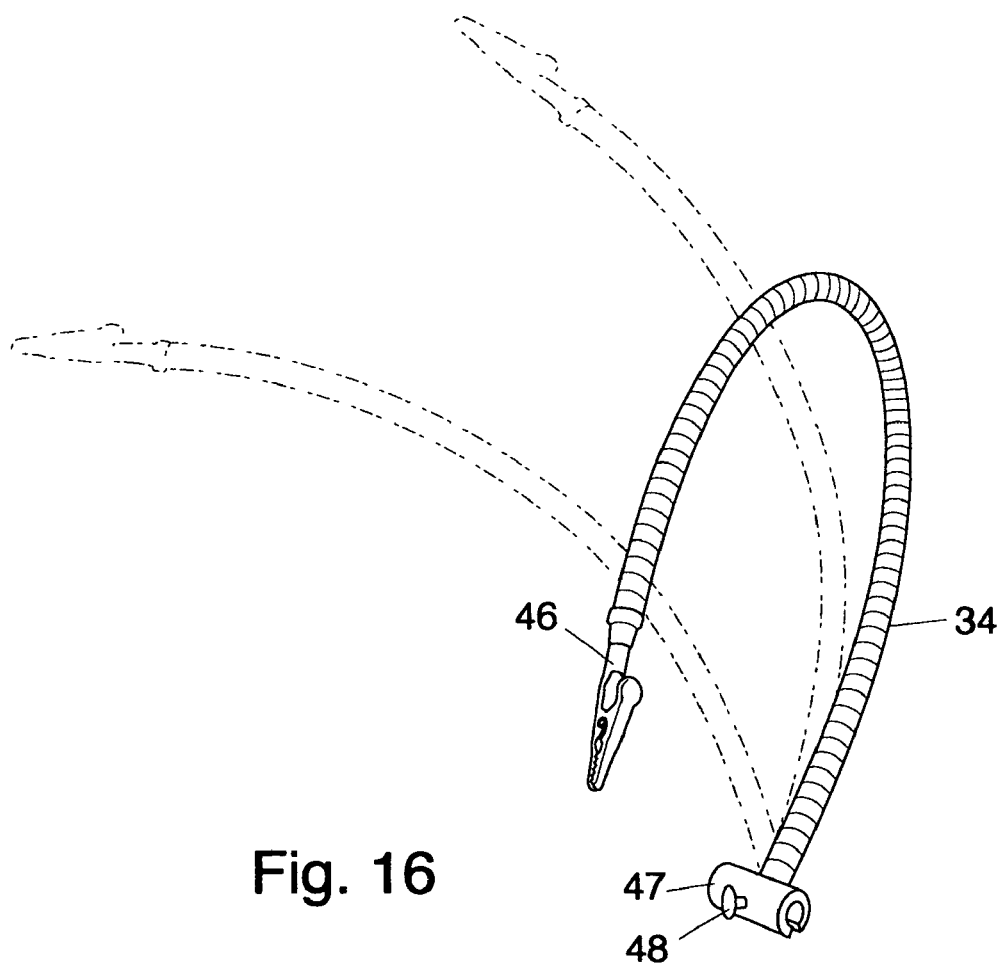
FIG. 16 is a perspective view of flexible arm attachment.

Also note that the flexible arm attachment 34 described in the additional embodiments and shown in FIGS. 9 and 16 can also be applied to this alternative workstation 20C and work in concert with the linear table attachment 40.

Advantages

From the description above, a number of advantages of my multipurpose portable ergonomic workstation become evident:

(a) The apparatus administers an ergonomic benefit, while being portable and adjustable, with multipurpose use, which will assist, but is not limited to, the factory worker, the small electronic repair shop, the costume jewelry maker, the hobbyist, the craft worker, and the physically challenged.

(b) The presence of a support frame that supports an arm rest while accommodating multiple attachments and accessories to work in accord, effectively assists the user and provides an ergonomic benefit.

(c) The apparatus will reduce muscle strain for a wide range of individuals who currently do not have such a benefit, with adjustable features that allow optimal positioning of the user's arms and working materials.

(d) Attachments and accessories free the user's hands by securing working materials assisting in the use of tools or other tasks, while administering ergonomic support for the user's upper body.

(e) Tension knobs provide adjustment features to the arm rest and allow for ease of use and versatility.

(f) Adjustment features let the user sit or stand at a workbench of appropriate height or sit at a table.

(g) Individuals who assemble or repair small components will be provided with an apparatus that will alleviate muscle fatigue and strain while doing repetitive or static tasks.

(h) The standalone apparatus functions without attachable accessories, expanding the use of such an apparatus to a wider range of users who would benefit from adjustable ergonomic support, while working in conjunction with existing apparatuses or working materials.

(i) Manufacturing would be inexpensive and it can be built from substantially any suitable material that will support its intended use, such as steel, wood, metal, aluminum, plastic, etc.

CONCLUSION, RAMIFICATIONS, AND SCOPE

Accordingly, it can be seen that the workstation of this invention provides a lightweight, highly durable, portable, yet ergonomic apparatus that would benefit a wide range of users. The capability of the apparatus to accommodate various attachments and accessories provides a benefit of reduced muscle strain delivered by optimal positioning of the upper body and working materials. Furthermore, the workstation has the additional advantages in that:

it provides an arm rest that is supported by a support frame that also allows for multiple attachments and accessories that work in conjunction with the workstation to provide an ergonomic benefit while assisting the user;
  it provides ease of use with versatility, and an ergonomic benefit to a wide range of individuals who do not presently have such an apparatus available to them;

it accommodates attachments that secure working materials to assist the user, freeing their hands for the use of tools they may be using, while having the ergonomic support for the user's upper body;

it provides adjustment for upper body support while sitting or standing at a workbench of appropriate height or to sit at a table, desk, etc;

it alleviates muscle fatigue and strain for individuals who work with small components doing repetitive or static tasks;

it also functions without attachable accessories, providing an arm rest that is adjustable for the user's comfort, and expanding the use of such an apparatus to a wider range of functions and tasks with existing apparatuses or in conjunction with working materials;

it can be manufactured from substantially any suitable material that will support its intended purpose.

Although the description above contains many specificities, these should not be construed as limiting the scope of the invention but as merely providing illustrations of some of the presently preferred embodiments of this invention. For example, the workstation can be of various size, can have a variance in shape, such as circular, triangular, etc., the arm rest can have a variant method of adjustment and locking mechanics, supplementary attachments can be adopted, etc.

Thus the scope of the invention should be determined by the appended claims and their legal equivalents, rather than by the examples given.

I claim:

1. A multipurpose ergonomic portable workstation comprising of:

a support frame made of at least one substantially elongated narrow span of equal thickness with a plurality of joints forming a substantially cross width span, further including two substantially side spans of equal length connecting one end of each to the two ends of said cross width span, with an arm rest base of predetermined elongated shape and size with substantially thick depth wherein length relatively spans distance between extended ends of said support frame and connects to thereof permitting said arm rest base to connect to extended ends of said support frame adjacent to said cross width span so that said support frame serves as a mounting agent for multiple removable adjustable attachments including means for temporarily securing working materials in an optimal position, assisting a human by mounting said removable adjustable attachments to said support frame adjacent to said arm rest base, also including an arm rest pad of substantially equal size and shape of said arm rest base having flat underside affixed to flat upper surface of said arm rest base, furthermore a plurality of rubber stops are fastened to the underside of said workstation for stabilization on any resting surface;

whereby supporting the upper body of said human in optimal position, working in conjunction with said adjustable attachments or existing apparatuses.

2. The workstation of claim 1 wherein said cross width span connects to said side spans further includes two sideways joints connecting one end of each said substantially two side spans on each extended end of said substantially cross width span at a relatively ninety degree position to thereof.

3. The workstation of claim 1 wherein said support frame further includes an incline extension connecting on each extended end of said two side spans by an incline joint angling said incline extension at a predetermined upward angle back toward said support frame at a relatively ninety degree position to said cross width span thereby said arm rest base attaches to said incline extensions in an elevated height adjustable position.

4. The workstation of claim 3 wherein said incline extensions connect to said side spans further includes a downward joint connected on each extended end of said two side spans with the opposing end of said downward joint further connecting to a forward joint that connects to said incline joint, angling said incline extensions at predetermined upward angle back toward said support frame, thereby forming downwardly jaunted protrusion from horizontal in said side spans approximately under said incline extensions whereby sloping said support frame front to back shifting the inertia of weight applied to said arm rest pad by said user back into said frame.

5. The workstation of claim 3 wherein said arm rest base attaches to said incline extensions further comprising of at least one joint coupler of substantially elongated shape that is adjustably joined to each of said incline extensions including at least two threaded cylinders fasten said couplers to each end of said arm rest base thereby said arm rest base is elevated from said working surface on the extended end of said support frame further including at least two tension knobs that temporarily secure arm rest base at a desired height.

6. The workstation of claim 5 wherein said arm rest base is adjustably joined to each extended end of said incline extensions with said at least one joint coupler further including a smooth bore through direct center of side thereof wherein said incline extensions are of predetermined equal thickness that go slidably through said smooth bore in each said coupler with a substantially female threaded bore through the length of said coupler whereas at least one substantially threaded cylinder is centrally bored into each end of said arm rest base each protruding from end thereof, thereby threadedly mated to said female threaded bore in each said coupler with said at least two tension knobs each including a protruding secondary male threaded cylinder that is threadedly mated to said female threads of a respective one of each said couplers thereby when tightened each said secondary male threaded cylinder is temporarily sandwiching each said incline extension securing the said arm rest base with friction whereby said arm rest base is adjustable to desired height and said at least one threaded cylinder permits pivotably to said arm rest base to and fro centrally along axis.

7. The workstation of claim 1 wherein said means for temporarily securing working materials by mounting said removable adjustable attachments to said support frame, comprising of a linear attachment that is of predetermined elongated shape is longitudinally adjustable forward and back on said support frame removably mounts with at least two attachment clips fastened to underside of said linear wherein said linear attachment is of a width and depth that provides a substantially elongated work surface that at least spans distance between said side spans whereby said work surface provides work area that includes a plurality of post holes bored to approximate depth in predetermined pattern across said work surface, further comprising of a circular attachment of circular shape and predetermined size including
an attachment base with a vertical notch in underside of said base that removably mounts to said cross width span wherein a substantially circular surface that is adjustably rotatable includes said plurality of post holes bored to approximate depth in predetermined pattern across said circular surface whereby said plurality of post holes permits removable insertion of
a plurality of telescopic posts of equal thickness and shape to said holes with said posts including a clamp attached to protruding ends thereof with said clamps temporarily securing said working materials, furthermore
a plurality of flexible arm attachments of narrow elongated shape with articulated invertebrate characteristics with said clamp attached on one end of each thereof including a substantially C-shaped bracket with at least one female threaded bore that is threadedly mated with at least one thumb screw of cylindrical shape with male threads, removably mounting said arm in a desired position on said support frame.

8. The workstation of claim 1 wherein said plurality of rubber stops are fastened at approximately four adjacent corners of said support frame for stabilization on any resting surface.

9. A multipurpose ergonomic portable workstation comprising of:
a support frame made of at least three substantially elongated narrow spans of equal thickness with a plurality of joints forming
a substantially cross width span, further including two substantially side spans of equal length connecting one end of each to the two ends of said cross width span, with
an arm rest base of predetermined elongated shape and size with substantially thick depth wherein length relatively spans distance between extended ends of said support frame and connects to thereof including
means for temporarily connecting said arm rest base to extended ends of said support frame wherein said arm rest base is height adjustable on said support frame further including
an arm rest pad of substantially equal size and shape of said arm rest base having flat underside affixed to flat upper surface of said arm rest base, furthermore
adjacent end of said support frame serves as a mounting agent for multiple adjustable attachments including
means for temporarily securing working materials in an optimal position, assisting a human by mounting removable adjustable attachments to said support frame adjacent to said arm rest base, also including
a plurality of rubber stops fastened at approximately four adjacent corners of said support frame for stabilization on any resting surface;
whereby supporting the upper body of a human in optimal position, working in conjunction with said adjustable attachments or existing apparatuses.

10. The workstation of claim 9 wherein said cross width span connects to said side spans further includes
two sideways joints connecting one end of each said substantially two side spans on each extended end of said substantially cross width span at a relatively ninety degree position thereof.

11. The workstation of claim 9 wherein said means for connecting said arm rest base height adjustable on said support frame further includes a removable forward extension joint temporarily connecting to each extended end of said two side spans with each opposing end of said forward extension joints connecting with
an incline joint with opposing ends connecting to
an incline extension angling at a predetermined upward angle back toward said support frame with said incline extensions at a relatively ninety degree relation to said cross width span with each end of said arm rest base connecting to said incline extensions by
at least one joint coupler of substantially elongated shape that is adjustably joined to each of said incline extensions with
at least one threaded cylinder fastening said coupler to each end of said arm rest base interconnecting in an elevated position on said incline extensions, and further including
at least two tension knobs which temporarily secure arm rest base at a desired height.

12. The workstation of claim 11 wherein said arm rest base is adjustably joined to each extended end of said incline extensions with said at least one joint coupler including
a smooth bore through direct center of side thereof wherein said incline extensions are of predetermined equal thickness that go slidably through said smooth bore in each said coupler with
a substantially female threaded bore through the length of each said coupler whereas said at least one threaded cylinder is centrally bored into each end of said arm rest base each protruding from end thereof, thereby threadedly mated to said female threaded bore in each said coupler with said at least two tension knobs each including a protruding secondary male threaded cylinder that is threadedly mated to said female threads of a respective one of each said couplers thereby when tightened each said secondary male threaded cylinder is temporarily sandwiching each said incline extension securing the said arm rest base with friction
whereby said arm rest base is adjustable to desired height and said at least one threaded cylinder permits pivotably to said arm rest base to and fro centrally along axis.

13. The workstation of claim 9 wherein said means for connecting said arm rest base height adjustable on said support frame further includes
a removable downward extension joint temporarily connecting to each extended end of said two side spans with opposing end of said downward extension joint further connecting to
a forward joint that connects to said incline joint, angling said incline extensions at predetermined upward angle back toward said support frame, thereby forming downwardly jaunted protrusion from horizontal in said side spans approximately under said incline extensions
whereby sloping said support frame front to back shifting the inertia of weight applied to said arm rest pad by said user back into said support frame.

14. The workstation of claim 9 wherein said means for temporarily securing working materials by mounting said removable adjustable attachments to said support frame, comprising of
a linear attachment which is of predetermined elongated shape is longitudinally adjustable forward and back on said support frame removably mounts with at least two attachment clips fastened to underside of said linear wherein said linear attachment is of a width and depth which provides a substantially elongated work surface that at least spans distance between said side spans whereby said work surface provides work area that includes a plurality of post holes bored to approximate depth in predetermined pattern across said work surface, further comprising of a circular attachment of circular shape and predetermined size including an attachment base with a vertical notch in underside of said base that removably mounts to said cross width span wherein a substantially circular surface that is adjustably rotatable includes said plurality of post holes bored to approximate depth in predetermined pattern across said circular surface whereby said plurality of post holes permits removable insertion of a plurality of telescopic posts of equal thickness and shape to said holes with said posts including a clamp attached to protruding ends thereof with said clamps temporarily securing said working materials, furthermore a plurality of flexible arm attachments of narrow elongated shape with articulated invertebrate characteristics with said clamp attached on one end of each thereof including a substantially C-shaped bracket with at least one female threaded bore that is threadedly mated with at least one thumb screw of cylindrical shape with male threads, removably mounting said arm in a desired position on said support frame.

* * * * *